(12) United States Patent
Delikat et al.

(10) Patent No.: US 9,976,693 B1
(45) Date of Patent: May 22, 2018

(54) ADJUSTABLE MOUNTING DEVICE FOR HUNTING WEAPONRY (71) Applicants: Diane Delikat, Bayonne, NJ (US); Robert Delikat, Bayonne, NJ (US)

(72) Inventors: Diane Delikat, Bayonne, NJ (US); Robert Delikat, Bayonne, NJ (US)

(*) Notice: Subject to any disclaimer, the term of this patent is extended or adjusted under 35 U.S.C. 154(b) by 0 days. days.

(21) Appl. No.: 15/358,740

(22) Filed: Nov. 22, 2016

(51) Int. Cl.
| | |
|---|---|
| *F41A 23/02* | (2006.01) |
| *F16M 11/14* | (2006.01) |
| *F16B 2/06* | (2006.01) |
| *F16B 2/08* | (2006.01) |
| *F16M 11/24* | (2006.01) |
| *F16M 11/16* | (2006.01) |
| *F16M 11/04* | (2006.01) |
| *F16M 13/02* | (2006.01) |
| *A01M 31/02* | (2006.01) |

(52) U.S. Cl.
CPC ............ *F16M 11/14* (2013.01); *A01M 31/02* (2013.01); *F16B 2/065* (2013.01); *F16B 2/08* (2013.01); *F16M 11/04* (2013.01); *F16M 11/16* (2013.01); *F16M 11/242* (2013.01); *F16M 13/022* (2013.01); *F41A 23/02* (2013.01)

(58) Field of Classification Search
CPC .......... F41A 23/00; F41A 23/02; F41A 23/16; F41A 23/18
USPC .............................................. 42/94; 89/37.04
See application file for complete search history.

(56) References Cited

U.S. PATENT DOCUMENTS

| | | | | |
|---|---|---|---|---|
| 2,427,365 A | * | 9/1947 | Meister | F41A 23/16 269/152 |
| 2,870,683 A | * | 1/1959 | Wilson | F41A 23/12 42/94 |
| 3,358,504 A | * | 12/1967 | Freebairn | F41A 23/16 73/167 |
| 4,493,395 A | | 1/1985 | Rittenhouse | |
| 4,823,673 A | * | 4/1989 | Downing | F41A 23/34 224/401 |
| 5,081,783 A | * | 1/1992 | Jarvis | F41A 23/16 42/94 |
| 5,476,188 A | | 12/1995 | Hassenpflug | |
| 5,497,575 A | * | 3/1996 | Fried | F41A 23/00 42/94 |
| 5,685,103 A | | 11/1997 | Wiggins | |
| 5,723,808 A | | 3/1998 | Devall | |
| 5,778,589 A | * | 7/1998 | Teague | F41A 23/02 42/94 |
| 5,921,348 A | | 7/1999 | Louk et al. | |
| 5,933,999 A | * | 8/1999 | McClure | B60R 7/14 42/94 |
| 6,032,911 A | | 3/2000 | Osborne | |
| 6,266,910 B1 | | 7/2001 | Horine | |
| 6,308,800 B1 | | 10/2001 | Graham, Jr. | |
| 6,375,052 B2 | | 4/2002 | Keton | |
| 6,574,899 B1 | * | 6/2003 | Mostello | F41A 23/16 42/94 |

(Continued)

*Primary Examiner* — Bret Hayes
(74) *Attorney, Agent, or Firm* — Gearhart Law LLC (57) ABSTRACT

Systems and methods for mounting a weapon are provided. The system includes an adjustable stand, which includes a support base, at least two adjustable cradles configured to secure a hunting weapon, a swivel joint configured to rotate the support base and secure the support base at a pivoting angle, and a mounting device configured to secure the adjustable stand to an external device, the mounting device being coupled to the swivel joint.

33 Claims, 7 Drawing Sheets

(56) References Cited

U.S. PATENT DOCUMENTS

| | | |
|---|---|---|
| 6,802,483 B1 | 10/2004 | Leasure |
| 7,137,480 B2 | 11/2006 | Williams |
| 7,165,750 B2 | 1/2007 | McCuskey et al. |
| 7,594,351 B1 | 9/2009 | Walker |
| 2011/0101192 A1* | 5/2011 | Lee ................. F16C 11/106 248/346.03 |
| 2012/0227305 A1* | 9/2012 | Fontenot ............ F41A 23/02 42/94 |

* cited by examiner

ADJUSTABLE MOUNTING DEVICE FOR HUNTING WEAPONRY

CLAIM OF PRIORITY

This application is a United States non-provisional application and claims no priority to any previous United States patent application.

FIELD OF THE EMBODIMENTS

This invention relates to weapon mounts and, in particular, to adjustable mounting devices for hunting weaponry.

BACKGROUND OF THE EMBODIMENTS

Humans have been hunting for most, if not all, of humanity's existence. Over that time, the methods by which individuals hunt have drastically changed. In particular, the weaponry has changed. For example, rather than throwing objects at prey, many hunters use weapons that launch projectiles, such as shotguns, rifles, crossbows, etc.

In modern times, many hunters, to avoid detection by their desired prey, wait in trees or other above-ground posts using tree stands. Many hunters simply hold their weaponry while in these tree stands, which can lead to human injuries.

Hunting can be a long process. During that time, hunters in tree stands may fall asleep. This may result in their weapons falling from the tree stand and colliding with the ground, possibly resulting in the unintentional discharge of the weapons, which can injure or kill the hunter or anyone unfortunate enough to be in the path of the projectile. Furthermore, this does not have to happen only as a result of falling asleep. When hunters are simply holding their weapons, any of a number of reasons could cause the hunters to drop their weapons. Therefore, for at least these reasons, a system is needed whereby hunting weaponry can be mounted, preventing the weaponry from falling, but still enabling the hunters to aim the weaponry at the desired prey.

Examples of related art are described below:

U.S. Pat. No. 7,594,351 provides for a device to be removably attached to a rifle or weapon to safely hoist and lower the weapon to and from an elevated stand. The device has a pair of legs which, together with the butt of the weapon, form a tripod to support the weapon while it is on the ground. A method for using the device.

U.S. Pat. No. 5,921,348 provides for a tree stand which is constructed of two platforms. Both platforms have a supporting frame, one covered with an open grid member, for standing, while the other has a seat for comfortable seating. The seating platform may be mounted to a tree or the like in one of two positions. One position locates the front end thereof in a downward direction. This opens the front end for use in bow hunting. The other or second position is inverted, with the front end located in an upward direction so that it defines a rest surface for rifle hunting. Each platform is supported by a flexible cable that extends from one side of the outer end of the platform, through a side support around the tree to another pivotal side support and is connected to the other side of the outer end. The cable itself is adjustable in length to accommodate different diameter trees.

U.S. Pat. No. 6,802,483 provides for a gun rest made of a high-strength, highly durable plastic, such as ABS, that is attachable to a tree stand. First and second U-shaped members have a mechanical element to permit its attachment to a portion of the frame of the tree stand. In a first embodiment, the attachment element is a third member with a ratchet face that engages a ratchet on the rear face of the first and second U-shaped members along with an T-shaped clamping arm that is adjustably bolted to the U-shaped member. The T-shaped clamping arm can be used to clamp other elements to the frame of the tree stand, as well. In a second embodiment the attachment element is a dowel that is received in an open end of the tree stand frame. The portions of the U-shaped members that support the gun are jacketed with an elastomeric non-slip surface that is preferably made of rubber.

U.S. Pat. No. 5,685,103 provides for a device for supporting a gun from a tree where the gun has a scope and the device supports the gun from the scope. The devices comprises a plate adapted to be attached to a tree by the use of an adjustable strap that surrounds the tree, an arm pivotally attached to the plate and extending therefrom so that an elastic member may be attached to the end of the arm distal from the plate, and a harness having a body and a first and second belt connected to the elastic member. The first and second belt encircle the front end and back end of the scope, respectively, and support the gun. The first and second belts are adjustable so that the gun can be balanced within the harness.

U.S. Pat. No. 7,165,750 provides for a caddy for supporting a weapon such as a rifle, gun, pistol, cross bow, or long bow while hunting. The caddy serves as an adjustable cradle for supporting the weapon while aiming at a target and a safety device for transporting the weapon. The caddy may be mounted to any suitable support structure such as a tree stand, tree, hunting blind, fence, all-terrain vehicle, wheelchair, or the like. In a particular embodiment, two or more caddies may be mounted on a tree stand to safely secure a weapon during set up in a tree. Each caddy may contain a safety device, such as a detachable rubber strap, for securing a weapon. When the safety device is removed, each caddy may be used as a cradle to support a weapon while aiming at a target, and the cradle may be adjusted horizontally, vertically, and/or pivotally.

U.S. Pat. No. 5,723,808 provides for an adjustable rest comprising: a support base; a mounting strap for attaching the support base to a rigid structure, such as a tree, above the head of a user; a first support member slidably connected to the support base; a second support member pivotally connected to the first support member wherein the second support member can be pivoted about at least two axes; a third support member pivotally connected to the second support member, wherein the third support member is adjustable in length; and a resting device operatively connected to the third support member for allowing a selected device to be rested thereon. The resting device may comprise a device for holding a gun, an archery bow, a camera, video recording device, or the like.

U.S. Pat. No. 4,493,395 provides for a tree seat that is designed for hunters, for ease of carrying, and effortlessly enables its user to elevate himself and the seat up a tree. Primarily, it consists of a folding frame, having a platform and a folding hammock seat. It also includes a safety belt, a tree belt, gun and bow supports, and a block and tackle for its elevation and descent.

U.S. Pat. No. 6,308,800 provides for a tree stand with a foot climber section having tree grippers, and a foot rest; a seat climber section with a rear end and a front end, tree grippers, tubular side members with front and rear ends, and inserts slidably in the side members between extended and retracted positions; and a seat releasably attachable to the inserts when the inserts are in the extended position, and releasably attachable to the seat climber tubular side members when the inserts are in the retracted position.

U.S. Pat. No. 6,375,052 provides for weapon holding straps that are a pair of nylon straps adapted for holding and readily releasing a firearm or bow across a hunter's lap while sitting on the ground or in a tree. Each nylon strap is formed from a leg strap and a weapon retainer strap of nylon webbing material attached together in cruciform fashion. The ends of each nylon strap have hook and loop material attached thereto. The leg strap is wrapped around the hunter's leg, the weapon retainer strap is wrapped around the firearm or bow. One strap is placed around the right leg and the other strap is placed around the left leg, the straps securing opposite ends of the firearm or bow, leaving the hunter's hands free while keeping the weapon readily accessible.

U.S. Pat. No. 6,266,910 provides for a holder for a hunting rifle or other weapon. comprised of a pair of identical assemblies, each of which is adapted to be secured to an individual's thigh. Secured to an individual's thighs, these two assemblies provide a convenient holder for supporting a rifle or other weapon in a position across the individual's lap, thereby freeing the individual's hands to perform other tasks. The weapon, however, is still advantageously positioned so that the individual has ready access to the weapon should game suddenly appear.

U.S. Pat. No. 5,476,188 provides for a gun boot comprising a hollow base having an open upper end and an open lower end; a mounting bracket secured to the base and removably securable to a tree stand; an upper lid removably coupled to the upper end of the base; a lower lid removably coupled to the lower end of the base; and a generally cone-shaped hollow flexible holster portion having a larger open upper extent and a smaller sealed lower extent with the upper extent secured to the lower end of the base, the holster portion positionable in an extended orientation with the lower extent projected from the lower end of the base and further positionable in a retracted orientation within the base.

U.S. Pat. No. 7,137,480 provides for a gun holder device for releasably securing a long gun to a tree stand. The device includes a pair of elongate flexible elements made of webbing or the like which are secured together in a substantially cross shape configuration. The first element includes a loop portion at one end which mounts a pair of D-rings for securing the gun in place on the stand. The second element includes first and second hooks and loops fasteners at opposite ends on opposite sides for securing the device to the frame of the stand.

U.S. Pat. No. 6,032,911 provides for attachable Weapon Support for supporting either a hunting bow or rifle comprising a clamp assembly for clamping the weapon support to either deer stand, hunting blind, or other stable support, an extendable support arm extending upwardly from the clamp assembly and supporting a weapon cradle including a weapon conforming channel having a resilient retaining arm for contacting and holding the weapon within the channel until needed but that will readily give way and allow for removal of the weapon when an animal is sighted.

None of the art described above addresses all of the issues that the present invention does. For example, none of the art described about addresses an adjustable stand having a support base, at least two adjustable cradles configured to secure a hunting weapon, a swivel joint, configured to rotate the support base and secure the support base at a pivoting angle, and a mounting device configured to secure the adjustable stand to an external device.

SUMMARY OF THE EMBODIMENTS

According to an embodiment of the present invention, an adjustable stand is provided. The adjustable stand includes: a support base; at least two adjustable cradles configured to secure a hunting weapon, the adjustable cradles being coupled to the support base; and a swivel joint, coupled to the support base, configured to: rotate the support base; and secure the support base at a pivoting angle. The adjustable stand further includes a mounting device configured to secure the adjustable stand to an external device, the mounting device being coupled to the swivel joint.

According to another embodiment of the present invention, a method of mounting a hunting weapon is provided. The method includes: securing an adjustable stand to a tree mount, the adjustable stand including: a support base; at least two adjustable cradles configured to secure a hunting device, the adjustable cradles being coupled to the support base; a swivel joint, coupled to the support base, configured to: rotate the support base; and secure the support base at a specified angle; and a mounting device configured to secure the adjustable stand to an external device, the mounting device being coupled to the swivel joint. The method further includes: adjusting a height of each of the at least two adjustable cradles such that the hunting device rests securely against each of the at least two adjustable cradles; adjusting the angle of the support base so that the support base is positioned at the specified angle; and securing the support base at the specified angle.

It is an object of the present invention to provide for the adjustable stand, wherein the support base includes a plurality of holes, each of the plurality of holes being configured to receive one of the at least two adjustable cradles.

It is an object of the present invention to provide for the adjustable stand, wherein the adjustable stand further includes a flexible strap configured to secure the hunting device to the adjustable mount.

It is an object of the present invention to provide for the adjustable stand, wherein the support base is further configured to enable a user to alter a distance between each of the at least two adjustable rests.

It is an object of the present invention to provide for the adjustable stand, wherein the swivel joint includes a ball and socket joint.

It is an object of the present invention to provide for the adjustable stand, wherein the support base further includes a center portion and two end portions, and wherein each of the end portions is coupled to the center portion via a hinged connection.

It is an object of the present invention to provide for the adjustable stand, wherein each of the at least two adjustable cradles are further configured to grip the hunting weapon.

It is an object of the present invention wherein the external device is a tripod.

It is an object of the present invention further comprising an adapter for securing the tripod to the adjustable stand.

DESCRIPTION OF THE PREFERRED EMBODIMENTS

Systems and methods are provided for mounting a hunting weapon onto an adjustable stand. The adjustable stand may include, but is not limited to, a support base, at least two adjustable cradles, a swivel joint, and a mounting device.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
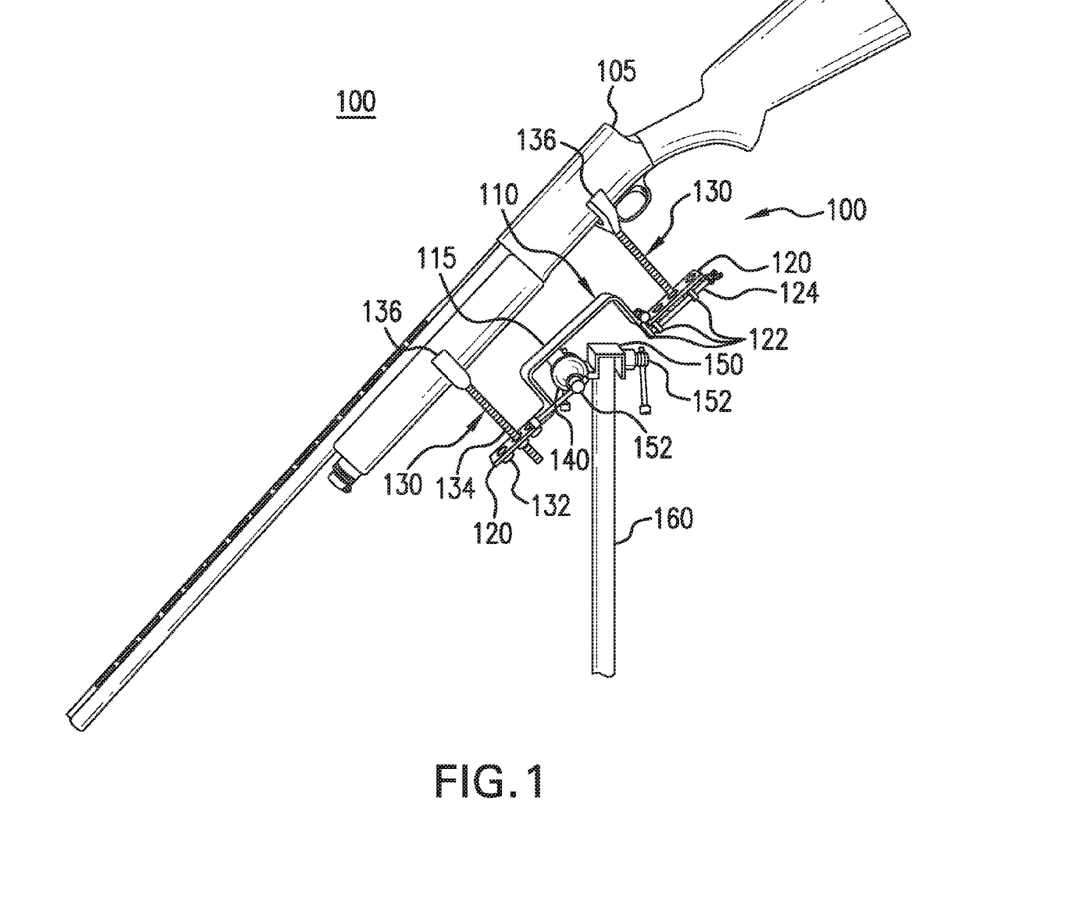
FIG. 1 shows a side perspective view of an adjustable mount for securing a hunting weapon, according to an embodiment of the present invention.

Referring now to FIG. 1, a side perspective view of an adjustable mount 100 for securing a hunting weapon 105 is illustrative depicted in accordance with an embodiment of the present invention.

The adjustable mount 100 may include, but is not limited to, a support base 110, at least two adjustable cradles 130, a swivel joint 140, and a mounting device 150. In another embodiment, the swivel joint may include internal threads in an effort to reduce the size of the joint itself. In the present embodiment, the swivel joint can be accessed at either end such that a left handed person can use the right end of the swivel joint while the right handed person can use the left end of the swivel joint.

According to an embodiment of the present invention, the support base 110 includes a center portion 115 and two end portions 120. One or both of the end portions 120 may be hingedly coupled to the center portion 115 via a hinge 117 (shown in FIGS. 2-5). In an embodiment of the present invention, the center portion 115 and one or more of the end portions 120 include at least one receiving portion 122 into which a rod 124 can be inserted, to secure the end portion 120 in its angular position relative to the center portion 115. In an embodiment, the rod 124 is a screw and at least one of the receiving portions 122 are threaded to receive the screw 124. In another embodiment, each of the hinges 117 may be a locking hinge. In another embodiment, the end portions 120 may be secured to the hinges 117 through a snap and lock feature, thereby eliminating the need for the rod 124.

In an embodiment, the end portions 120 each have a plurality of openings 132. Each of these openings 132 is configured to receive one of the adjustable cradles 130, enabling the height or each or the at least two adjustable cradles 130 to be adjusted. In an embodiment, one or more of the two or more adjustable cradles 130 include a screw portion 134. In an embodiment, one or more of the plurality of openings 132 is designed to enable the screw portion 134 of the adjustable cradle 130 to be threaded within the opening 132. In an embodiment, the distance between the adjustable cradles 130 can be increased or decreased. In another embodiment, the adjustable cradle 130 may be configured to snap and lock into the plurality of openings 132.

In an embodiment, one or more of the at least two adjustable cradles 130 include a weapon-receiving portion 136 designed to house a hunting weapon 105. The hunting weapon 105 can be any hunting weapon 105 that can be suitably placed on the adjustable mount 100 such as, for example, a rifle, a shotgun, a crossbow, a harpoon, etc.

The weapon-receiving portions are designed to hold and secure the hunting weapon 105. In an embodiment, one or more of the weapon-receiving portions 136 includes a padded U-shaped holder. In an embodiment, one or more of the weapon-receiving portions 136 includes one or more sidewalls. In an embodiment, the distance between the one or more sidewalls can be adjusted. According to an embodiment, the weapon-receiving portions 136 are configured to grip the hunting weapon 105. In another embodiment, the weapon receiving portions may be uniquely shaped to enable the weapon to be secured tightly.

Coupled to the base portion 110 is a mounting device 150. The mounting device 150 enables the adjustable mount 100 to be secured to a shooting rail 160 of a tree stand. In an embodiment, the mounting device is a screw clamp, enabling a screw 152 to be tightened against shooting rail 160 of a tree stand. The mounting device 150 can also be any other type of mounting device in conformity with the spirit of the present invention. In another embodiment, the mounting device 150 may be made without a nut protrusion and instead have threads on the inside of the mounting device.

According to an embodiment, once the adjustable mount 100 is secured to the shooting rail 160 of a tree stand, the adjustable mount 100 can be rotated about the swivel joint 140, enabling a user to accurately angle the weapon 105. According to an embodiment, the angle of the adjustable mount 100 can be secured with the tightening of one or more screws 152 within the swivel joint 140. Of course, other methods of securing the angle of the adjustable mount 100 may also be used, while maintaining the spirit of the present invention.

Figure 2:
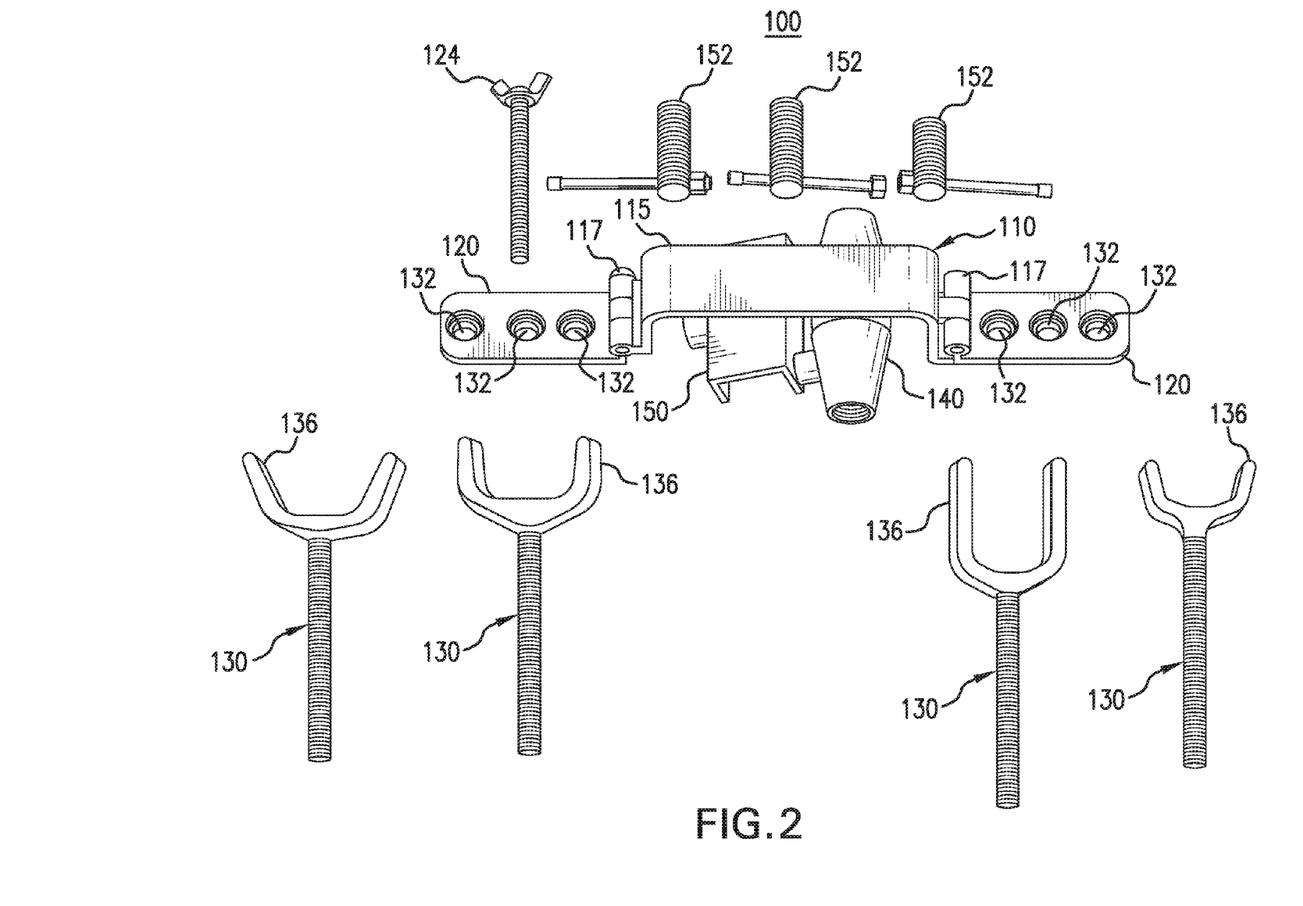
FIG. 2 shows an exploded view of an adjustable mount for securing a hunting weapon, according to an embodiment of the present invention.
Figure 3:
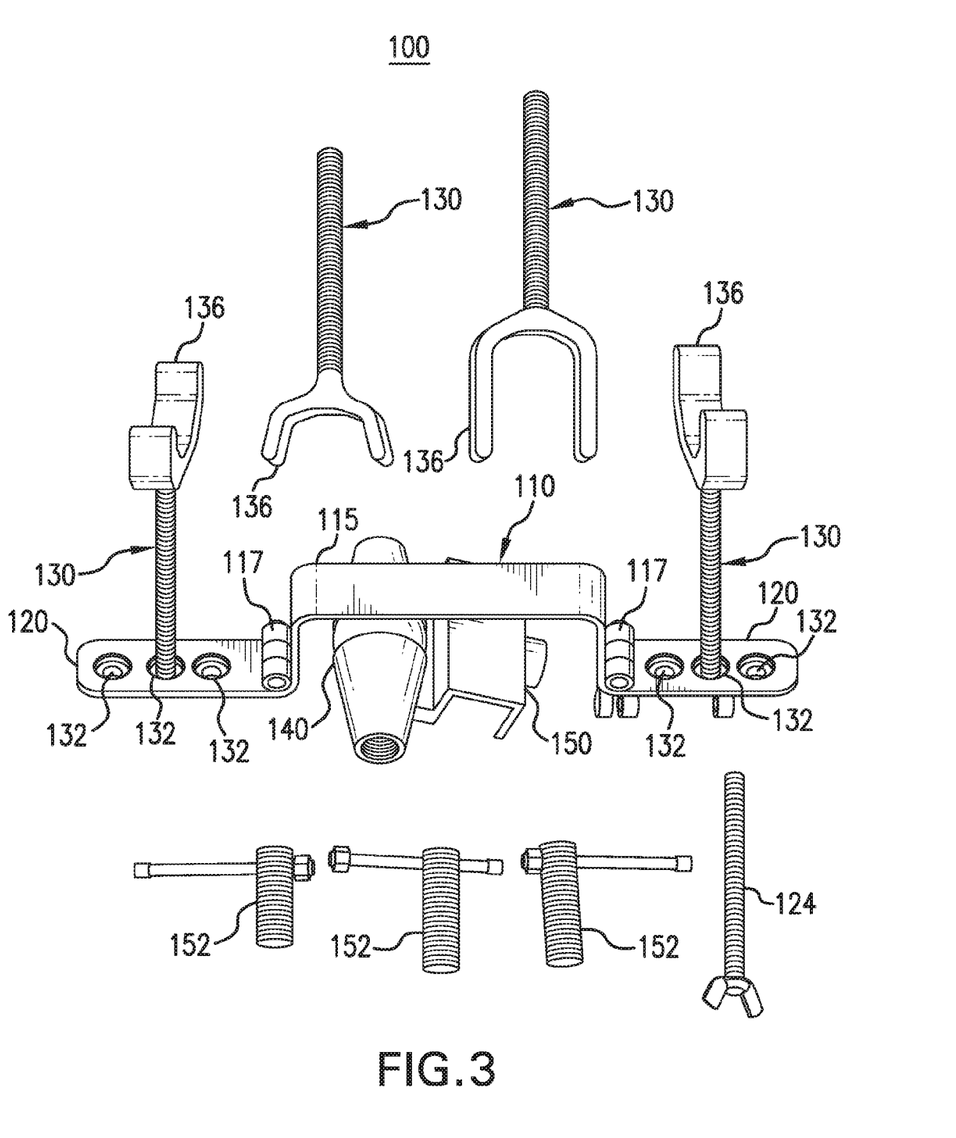
FIG. 3 shows an exploded view of an adjustable mount for securing a hunting weapon, according to an embodiment of the present invention.

Referring now to FIGS. 2-3, an exploded view of the adjustable mount 100 for securing the hunting weapon 105 are illustratively depicted, in accordance with embodiments of the present invention.

As can be seen in FIGS. 2-3 the adjustable cradles 130 can have weapon-receiving portions 136 having varied shapes, which may be configured to grip certain weapons 105 or a variety of weapons 105. According to an embodiment, the adjustable cradles 130 may be removed from the holes 132 and replaced with other adjustable cradles 130. In another embodiment, the nut protrusions on the opposite end of the holes 132 may be eliminated. In another embodiment, different weapon receiving portions 136 can be used for different types of weapons. The weapon receiving portion 136 may be screwed on and off to the desire of a user. In another embodiment, the weapon receiving portion may be configured so that the weapon may slide in, snap in or can be inserted into a spring loaded mechanism.

Figure 4:
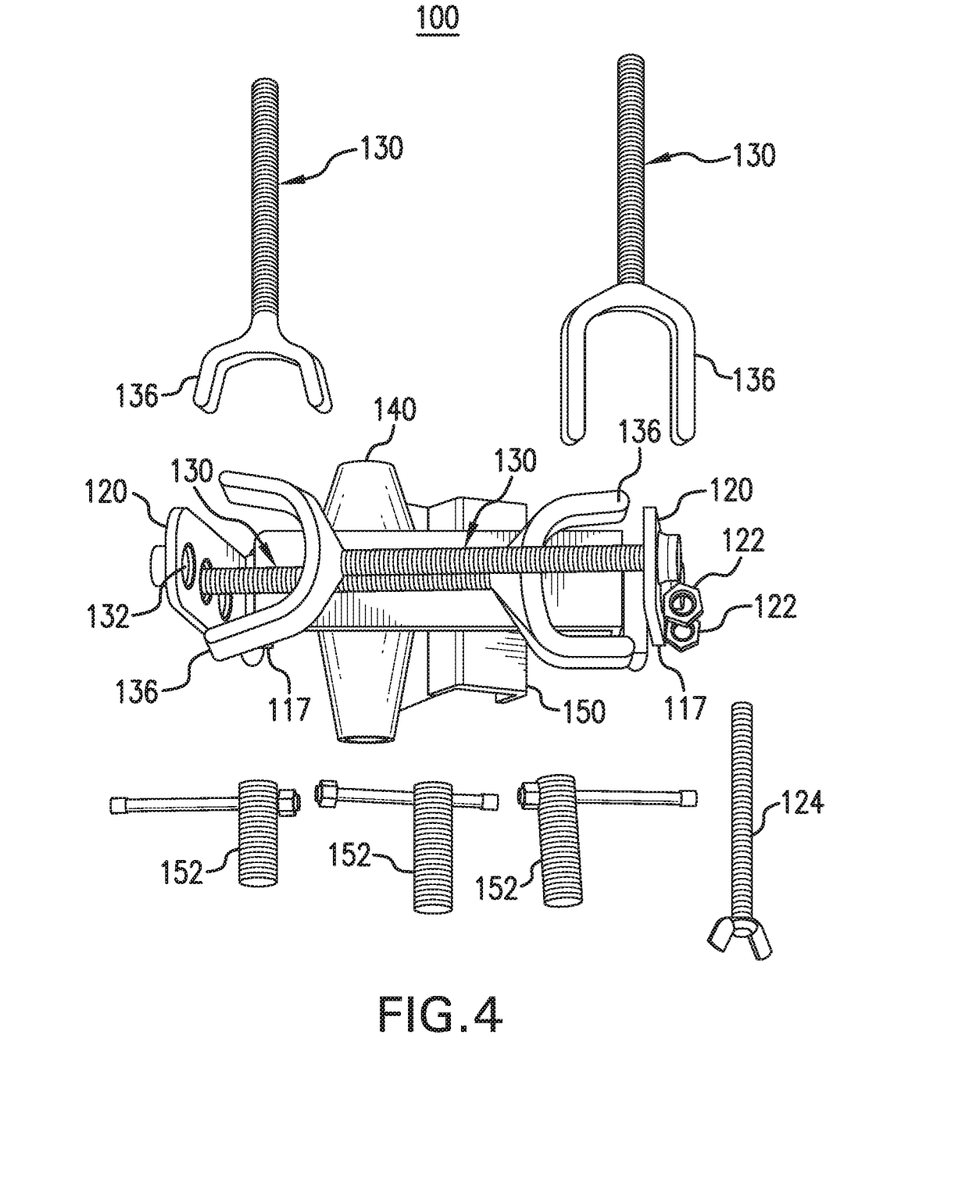
FIG. 4 shows a semi-exploded view of a collapsed adjustable mount for securing a hunting weapon, according to an embodiment of the present invention.
Figure 5:
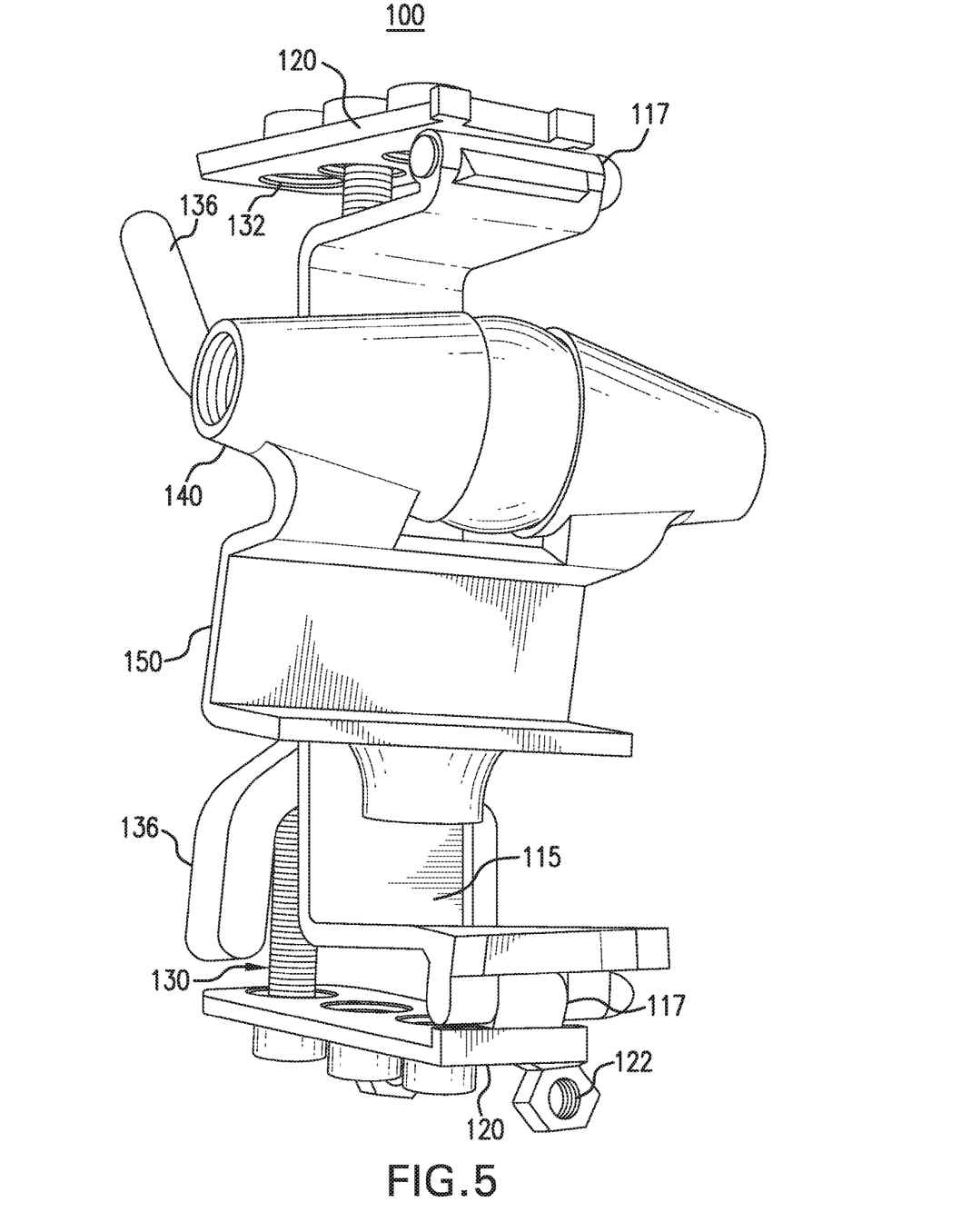
FIG. 5 shows an off-side perspective view of a adjustable mount for securing a hunting weapon, according to an embodiment of the present invention.

Referring now to FIGS. 4-5, a semi-exploded view (FIG. 4) and an off-side perspective view (FIG. 5) of a collapsed adjustable mount 100 for securing a hunting device 105 are illustratively depicted, in accordance with embodiments of the present invention. FIG. 4 shows the attached adjustable cradles folded inward.

According to an embodiment, one or more of the end portions 120 can be rotated around the one or more hinges 117 to enable the adjustable mount 100 to be collapsed or folded inward. This enables the adjustable mount 100 to take up less space, making it easier to transport. Tree mounts can include tree stands, tree branches or any tree mounts that require climbing, or tree mounts that can collapse or that are an adjustable mount that allows a user to more easily carry. The adjustable mount 100 may be adjusted up to a desired height on the tree mount. It is noted, however, that the adjustable mount 100 may be used in locations other than tree mounts such as, e.g., a boat, a fence, etc.

Figure 6:
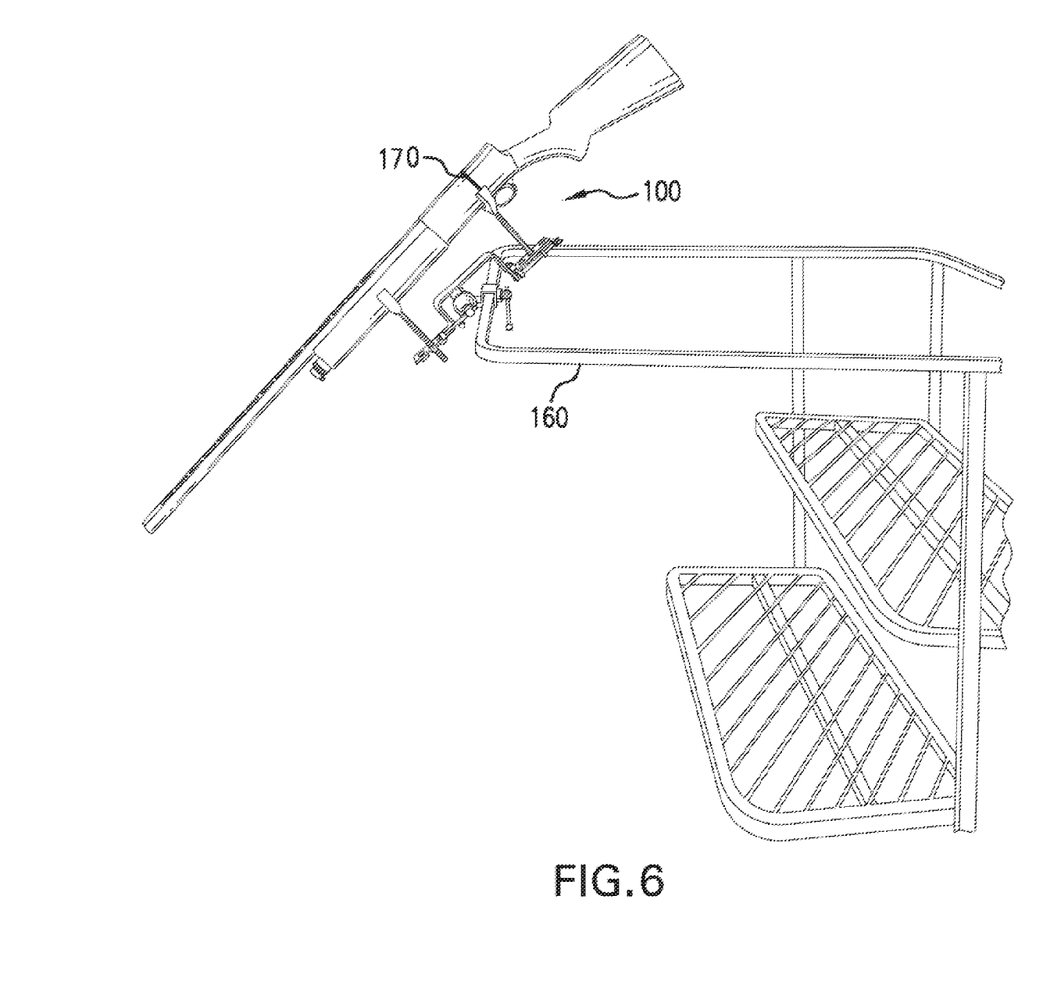
FIG. 6 shows an off-side perspective view of an adjustable mount for securing a hunting weapon, according to an embodiment of the present invention.
Figure 7:
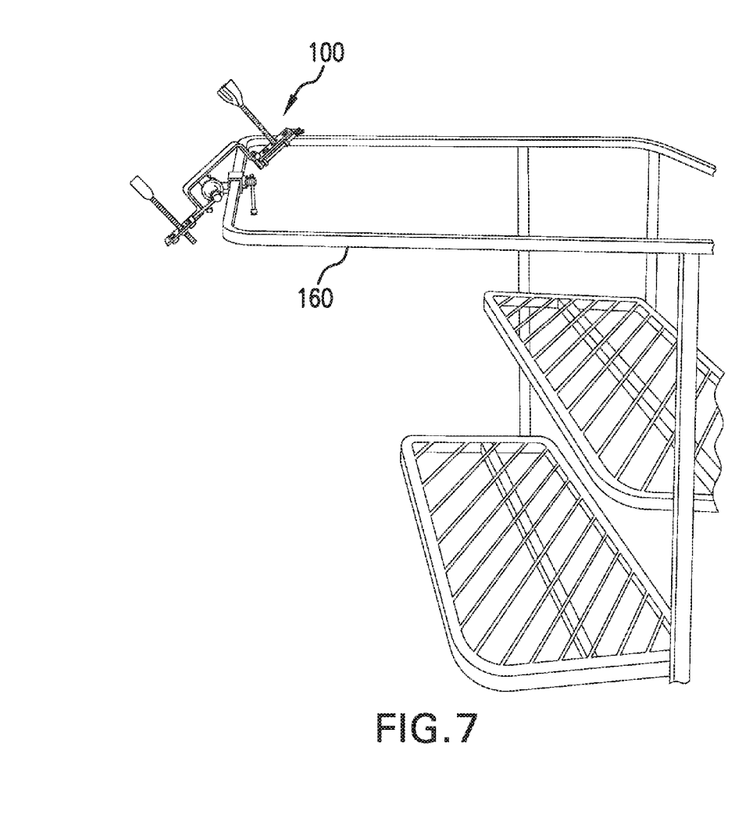
FIG. 7 shows an off-side perspective view of an adjustable mount for securing a hunting weapon, according to an embodiment of the present invention.

Referring now to FIGS. 6-7, off-side perspective views of the adjustable mount 100 with a weapon 105 mounted on the adjustable mount 100 (FIG. 6) and without the weapon 105 mounted on the adjustable mount 100 (FIG. 7) are illustratively depicted, in accordance with the embodiments of the present invention.

According to the embodiments shown in FIGS. 6-7, the adjustable mount 100 is mounted onto the shooting rail 160 of a tree stand. It is noted, however, that the adjustable mount 100 may be used in locations and mounted on external devices other than a shooting rail 160 of a tree stand, such as, e.g., a boat, a fence, etc. In the present embodiment, the adjustable mount 100 can be used by a left handed person or a right handed person. In another embodiment, the materials can be of foam, rubber, silicone, plastic derivative, acrylic, graphite, titanium, steel or any other suitable material, while maintaining the spirit of the present invention. In another embodiment, the adjustable cradle can be of material such as memory metal that may be formed around the gun. In a further embodiment, the width of the adjustable cradle may be adjustable and malleable without making noise. According to an embodiment, the adjustable amount is approximately 12 inches long and, when collapsed, the adjustable amount is approximately 6 and ½ inches long. According to an embodiment, the height of the adjustable mount is approximately 3 inches while the width is approximately 4 inches. In another embodiment, the flexible strap 170 is a safety strap which is attached to the weapon on one end and the adjustable mount on the other end to ensure the weapon is secured to the adjustable mount if the weapon should fall from the adjustable mount.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:
1. An adjustable stand, comprising:
   a collapsible support base;
   at least two adjustable cradles configured to secure a hunting weapon, the at least two adjustable cradles being coupled to the support base,
   wherein the support base is configured to be locked in an open position prior to securing the hunting weapon;
   a swivel joint, coupled to the support base, configured to:
      rotate the support base; and
      secure the support base at a pivoting angle; and
   a mounting device configured to secure the adjustable stand to an external device, the mounting device being coupled to the swivel joint.

2. The adjustable stand as recited in claim 1, wherein the support base includes a plurality of holes, each of the plurality of holes being configured to receive one of the at least two adjustable cradles.

3. The adjustable stand as recited in claim 2, wherein each of the at least two adjustable cradles includes a threaded rod configured to screw into at least one of the plurality of holes in the support base.

4. The adjustable stand as recited in claim 1, further comprising a flexible strap configured to secure the hunting weapon to the adjustable stand.

5. The adjustable stand as recited in claim 1, wherein the mounting device is a screw clamp.

6. The adjustable stand as recited in claim 1, wherein the mounting device includes a threaded bolt.

7. The adjustable stand as recited in claim 1, wherein the external device is a tree mount.

8. The adjustable stand as recited in claim 1, wherein the support base is further configured to enable a user to alter a distance between each of the at least two adjustable cradles.

9. The adjustable stand as recited in claim 1, wherein the swivel joint further includes at least one threaded hole configured to receive a screw.

10. The adjustable stand as recited in claim 9, wherein the swivel joint is further configured to be secured at the pivoting angle when a screw is tightened within the at least one threaded hole.

11. The adjustable stand as recited in claim 1, wherein the swivel joint includes a ball and socket joint.

12. The adjustable stand as recited in claim 1, wherein the hunting weapon is selected from the group consisting of a rifle; a crossbow; and a harpoon.

13. The adjustable stand as recited in claim 1, wherein the support base further includes a center portion and two end portions.

14. The adjustable stand as recited in claim 13, wherein each of the two end portions is coupled to the center portion via a hinged connection.

15. The adjustable stand as recited in claim 13, wherein the at least two adjustable cradles are coupled to the support base at the two end portions.

16. The adjustable stand as recited in claim 1, wherein each of the at least two adjustable cradles are further configured to grip the hunting weapon.

17. The adjustable stand as recited in claim 16, wherein each of the at least two adjustable cradles further comprise two sidewall portions configured to house a portion of the hunting weapon there between.

18. The adjustable stand as recited in claim 17, wherein a width between the two sidewall portions is adjustable.

19. The adjustable stand as recited in claim 17, wherein each of the at least two adjustable cradles are further configured to enable a user to alter a distance between the two sidewall portions.

20. The adjustable stand as recited in claim 17, wherein the two sidewall portions form a U-shape.

21. The adjustable stand as recited as recited in claim 1, wherein the external device is a tripod.

22. The adjustable stand as recited in claim 21, further comprising an adapter for securing the tripod to the adjustable stand.

23. A method of mounting a hunting weapon, comprising:
securing an adjustable stand to an external device, the adjustable stand including:
a collapsible support base;
at least two adjustable cradles configured to secure a hunting device, the at least two adjustable cradles being coupled to the support base;
a swivel joint, coupled to the support base, configured to:
rotate the support base; and
secure the support base at a specified angle; and
a mounting device configured to secure the adjustable stand to the external device, the mounting device being coupled to the swivel joint;
locking the support base in an open position:
adjusting a height of each of the at least two adjustable cradles such that the hunting device rests securely against each of the at least two adjustable cradles, wherein the support base is configured to be locked in the open position prior to securing the hunting weapon;
adjusting the angle of the support base so that the support base is positioned at the specified angle; and
securing the support base at the specified angle.

24. The method as recited in claim 23, wherein securing the support base at the specified angle further includes inserting at least one screw into a threaded hole located on the swivel joint.

25. The method as recited in claim 23, wherein the support base further includes a center portion and two end portions, and wherein each of the end portions is coupled to the center portion via a hinged connection.

26. The method as recited in claim 25, further comprising securing a position of at least one of the two end portions in relation to the center portion.

27. The method as recited in claim 26, wherein the securing the position of at least one of the two end portions further includes inserting a screw within at least one hole positioned on the adjustable cradle and at least one hole located on the center portion.

28. The method as recited in claim 23, further comprising adjusting, for each of the at least two adjustable cradles, a distance between two sidewall portions located on each of the at least two adjustable cradles, wherein the two sidewall portions are configured to house a portion of the hunting weapon there between.

29. The method as recited in claim 23, wherein the hunting weapon is selected from the group consisting of a rifle; a crossbow; and a harpoon.

30. The method as recited in claim 23, wherein the mounting device is a screw clamp.

31. The method as recited in claim 23, wherein the mounting device includes a threaded bolt.

32. The method as recited in claim 23, wherein the external device is a tree mount.

33. The method as recited in claim 23, wherein the external device is a tripod.

* * * * *